July 29, 1930. J. S. THOMPSON 1,771,595
FRICTION BRAKE
Filed Dec. 3, 1928 2 Sheets-Sheet 2

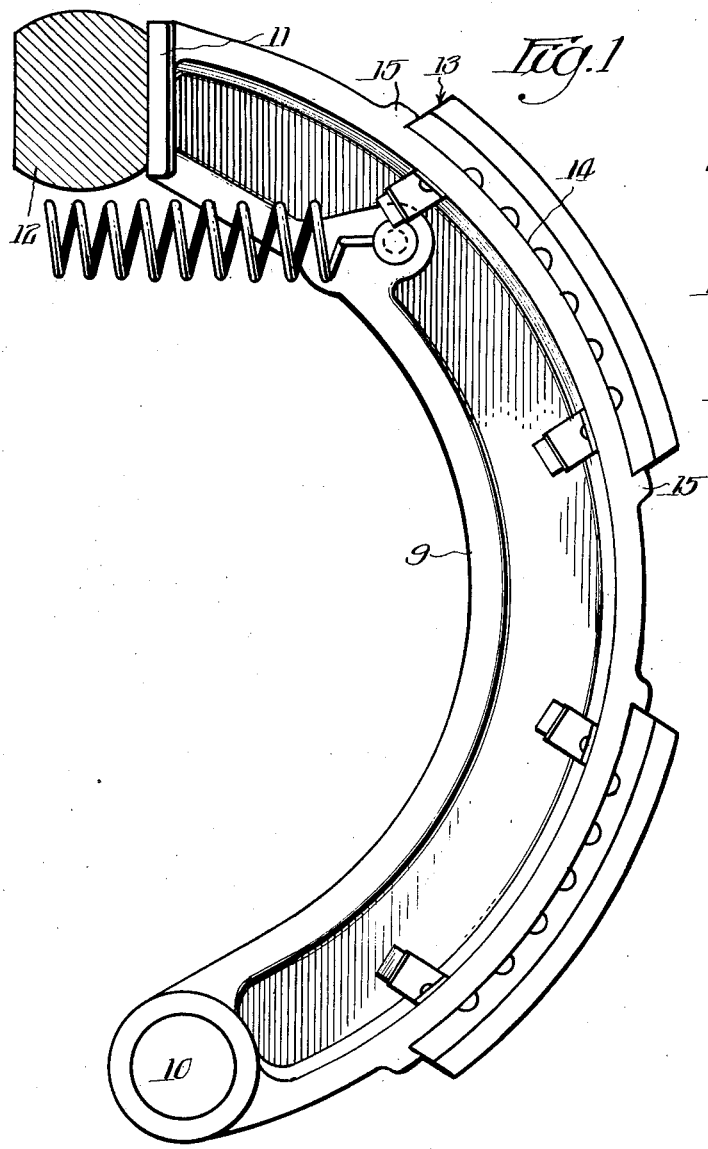
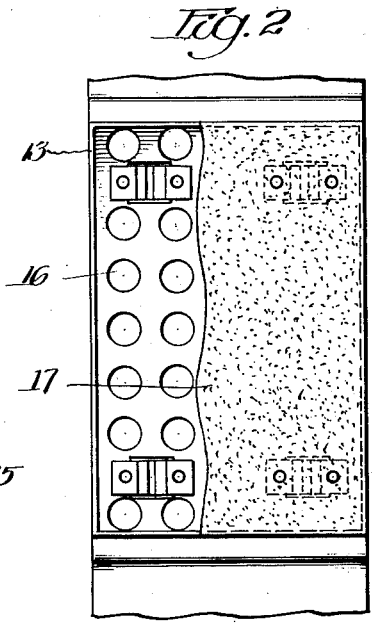
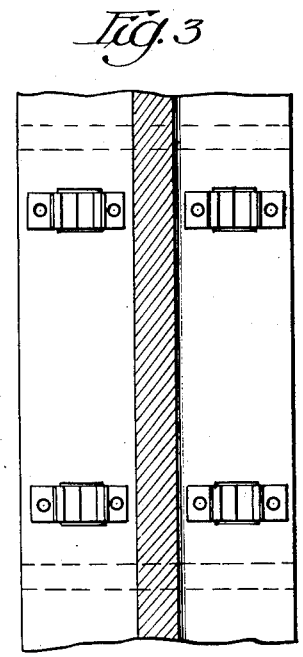

Inventor
James S. Thompson
By Wm. O. Belt Atty.

Patented July 29, 1930

1,771,595

UNITED STATES PATENT OFFICE

JAMES S. THOMPSON, OF NEW YORK, N. Y., ASSIGNOR TO AMERICAN BRAKE MATERIALS CORPORATION, OF NEW YORK, N. Y., A CORPORATION OF NEW YORK

FRICTION BRAKE

Application filed December 3, 1928. Serial No. 323,311.

This invention relates to friction brakes and more particularly to means for securing a friction block on a support to be moved into and out of operative engagement with a member to be braked.

The object of the invention is to provide novel and simple means for detachably securing a friction block to its support whereby the block may be readily mounted on the support in operative position and as readily removed for replacement if required.

And another object of the invention is to provide means whereby a friction block may be easily and securely mounted on its support in a friction brake assembly while the assembly is in service and without requiring any mechanical work or the use of any tools for installing or removing the block.

In the accompanying drawings I have illustrated the invention for use in an internal expanding brake assembly and referring thereto:

Fig. 1 shows two blocks mounted on a head or arm, the operating cam being shown in section.

Fig. 2 is a plan view of a portion of Fig. 1 showing the body of the block partly broken away.

Fig. 3 is a bottom section of the part shown in Fig. 2 with the web of the head in section.

Figure 4:
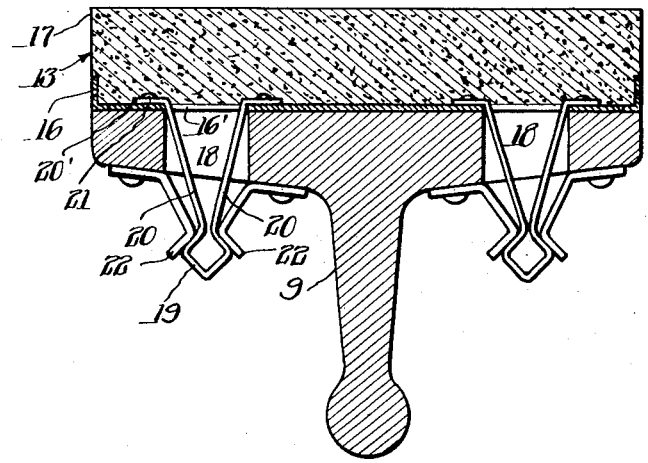
Fig. 4 is an enlarged transverse sectional view through the block and head.
Figure 5:
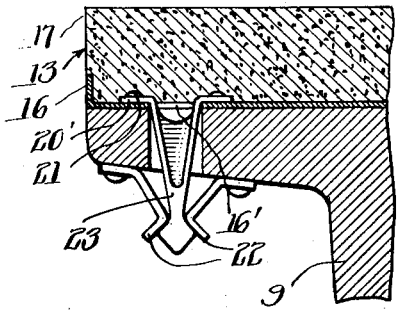
Figs. 5-8 are detail sectional views showing other forms of the invention.
Figure 6:
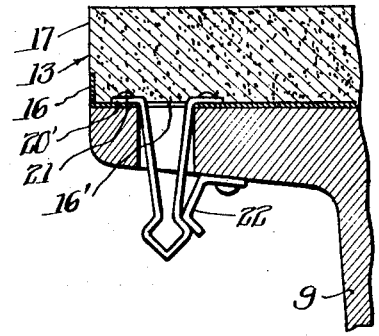
Figure 7:
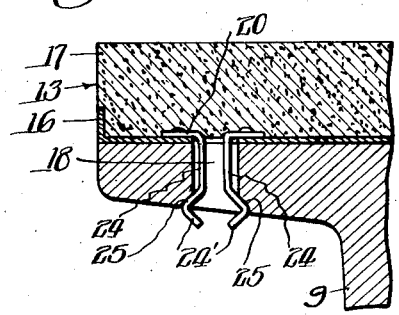
Figure 8:
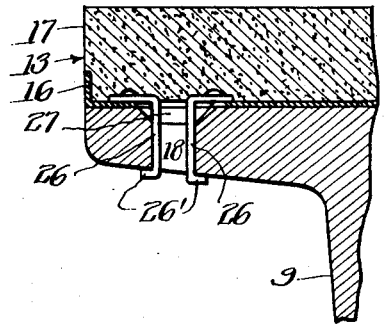

Referring to the drawings the head or shoe 9 is provided at one end with an eye 10 for engagement with a pivot stud and at its other end with a bearing 11 to be engaged by the cam 12. This head may be made in any size and form adapted to receive one or more brake blocks 13 and it is provided with a seat 14 to receive the block and may also have stops 15 at the ends of the seat. The block 13 is provided with a metal back 16 and it may have a body 17 of any suitable composition mounted on or embedded in the back which is provided with openings to receive the body material and may have other means whereby the body and the back are securely anchored together. The head is provided with openings 18 and the block is provided with clips which project outward from the back of the block and are adapted to be anchored in said openings for securing the block on the head. These clips may be made in different forms and in Fig. 4 I have shown a clip made of one strip of metal bent to form a head 19 with arms 20 extending therefrom and projecting through an opening 16' in the back 16 of the block, the free ends 20' of the arms being turned outward and secured to the back on the inside thereof by rivets 21 or other suitable fastening means. The head 19 is substantially rectangular in shape and yielding anchoring devices 22 are fastened on the head on opposite sides of the openings 18 to be engaged by the head 19 of the clip. The block will be provided with a plurality of clips, preferably four, disposed adjacent the four corners of the block, and the head will be provided with openings 18 properly disposed to receive the clips. When the block is mounted on the head the clips will be projected through the openings 18 into engagement with the anchoring devices 22 and then pressure will be applied to the block to force the heads 19 of the clips into anchoring engagement with said devices. The clips may be made of metal which will yield more or less while they are being engaged with the anchoring devices to facilitate the operation. To remove the block sufficient force is applied to the block to pull the clips away from the anchoring devices and for this purpose it may be convenient to use some tool as a pry between the block and the head or to assist in disengaging the clips from the anchoring devices. The construction shown in Fig. 5 is substantially the same as that shown in Fig. 4 except that the clip 23 is made solid. The construction of Fig. 6 is also substantially the same as that of Fig. 4 except that only one anchoring device 22 is employed. In Fig. 7 the clip is made in two parts 24 with angular end portions 24' adapted to engage the edge of the opening 18 at the outer end thereof, this edge being preferably beveled at 25 to facilitate the engagement and disengagement of the two parts of the clip therewith. In Fig. 8 the clip is also made in two parts 26 with their outer ends 26' turned outward to make anchoring engagement with the head. The inner end of the opening 18 is provided with a countersink 27 to facilitate the movement of the ends 26' into the opening 18 when the block is applied to the head.

My invention provides a simple means whereby a friction block may be engaged with its support and securely held in position thereon for service and whereby the block may be readily disengaged from the support for replacement. The construction is such that the installation and removal of the block may be accomplished without involving any mechanical work and without the use of any tools because it is possible to release the clips from the anchoring means by hand although it may be found convenient at times to use a tool or something of the kind to facilitate this operation. The invention is important because it enables the replacement of a worn block quickly and without requiring the facilities of a machine or other shop and also without taking the vehicle out of service for more than a very limited period.

I have shown the invention as it may be used in connection with an internal expanding brake assembly, and in several different forms, but the invention may also be used in an external contracting brake and in brake assemblies of many different kinds and I reserve the right to make all such changes as may be required or may be desirable in adapting the invention for different installations within the scope of the following claims.

I claim:

1. A friction brake comprising a brake head having an opening therein, a brake block seated on the head, a clip secured to the block and projecting outward from the back thereof and through said opening in the head, and means on the back of the head for detachably anchoring the clip to the head.

2. A friction brake comprising a brake head having an opening therein, a brake block seated on the head, a yielding clip secured to the block and projecting outward from the back thereof and through said opening in the head, and means on the back of the head for detachably anchoring the clip to the head.

3. A friction brake comprising a brake head having an opening therein, a brake block seated on the head, a clip made of a metal strip bent upon itself to form a head with arms projecting therefrom, said arms being secured to the block and projecting outward from the back thereof and through said opening in the brake head, and means on the brake head for engaging the clip head for detachably anchoring the clip to the brake head.

4. A friction brake comprising a brake head having an opening therein, a brake block seated on the head, a clip secured to the block and projecting outward from the back thereof and through said opening in the head, and yielding means on the head for anchoring the clip thereto.

5. A friction brake comprising a brake head having an opening therein, a brake block seated on the head, a clip secured to the block and projecting outward from the back thereof and through said opening in the head, and oppositely disposed anchoring devices on the head engaging the clip.

6. A friction brake comprising a brake head having an opening therein, a brake block seated on the head, a clip secured to the block and projecting outward from the back thereof and through said opening in the head, and oppositely disposed yielding means on the head for engaging and anchoring the clip.

7. A friction brake comprising a brake head having an opening therein, a brake block seated on the head, a clip secured to the block and projecting outward from the back thereof and through said opening in the head, said clip having a head at its outer end, and anchoring means on the head for engaging the head of the clip.

8. A friction brake comprising a brake head having an opening therein, a brake block having a metal back and seated on the head, a clip secured to said metal back and projecting outward therefrom and through said opening in the head, and means for detachably anchoring the clip to the head.

9. A friction brake comprising a brake head having an opening therein, a brake block having a metal back and seated on the head, said metal back having an opening therein, a clip secured to the metal back and projecting through the opening therein and the opening in the head, and means for detachably anchoring the clip to the head.

10. A friction brake comprising a brake head having an opening therein, a brake block seated on the brake head, a yielding clip secured to the block and projecting outward from the back thereof and through the opening in the brake head, said clip having a head at its outer end, and yielding means on the brake head for engaging the clip head to anchor the clip to the brake head.

11. A friction brake comprising a brake head having an opening therein, a brake block seated on the brake head, a clip secured to the block and projecting outward from the back thereof and through said opening in the brake head, a clip secured to the block and projecting outward from the back thereof and through said opening in the brake head, said clip having a head at its outer end, and means on the brake head for engaging the clip head to anchor the clip to the brake head, the clip and anchoring means being engageable and disengageable with a yielding snap action.

JAMES S. THOMPSON.